(12) United States Patent
Roxburgh et al.

(10) Patent No.: US 8,666,940 B2
(45) Date of Patent: Mar. 4, 2014

(54) METHOD AND APPARATUS FOR COMMUNICATING DATA BETWEEN COMPUTER DEVICES

(75) Inventors: David Roxburgh, Ipswich (GB); Simon A Beddus, Ipswich (GB); Patrick B Farley, Ipswich (GB); Michael R Hosking, Ipswich (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 964 days.

(21) Appl. No.: 10/594,124

(22) PCT Filed: Mar. 23, 2005

(86) PCT No.: PCT/GB2005/001100
§ 371 (c)(1),
(2), (4) Date: Sep. 25, 2006

(87) PCT Pub. No.: WO2005/096590
PCT Pub. Date: Oct. 13, 2005

(65) Prior Publication Data
US 2007/0143481 A1    Jun. 21, 2007

(30) Foreign Application Priority Data

Mar. 31, 2004  (GB) .................................. 0407388.8

(51) Int. Cl.
*G06F 17/30* (2006.01)
(52) U.S. Cl.
USPC ......................................................... 707/621
(58) Field of Classification Search
None
See application file for complete search history.

(56) References Cited

U.S. PATENT DOCUMENTS

| | | | |
|---|---|---|---|
| 5,935,211 A * | 8/1999 | Osterman | 709/228 |
| 6,081,906 A * | 6/2000 | Nishizawa et al. | 714/2 |
| 6,094,485 A | 7/2000 | Weinstein et al. | |
| 6,510,464 B1 * | 1/2003 | Grantges et al. | 709/225 |
| 6,546,432 B2 * | 4/2003 | Couturier et al. | 719/318 |
| 6,751,677 B1 * | 6/2004 | Ilnicki et al. | 719/316 |
| 6,763,384 B1 * | 7/2004 | Gupta et al. | 709/224 |

(Continued)

FOREIGN PATENT DOCUMENTS

| | | |
|---|---|---|
| EP | 1244270 A2 | 2/2002 |
| GB | 2366032 A | 2/2002 |

(Continued)

OTHER PUBLICATIONS

International Search Report dated Jun. 15, 2005 and Written Opinion of the International Searching Authority.

(Continued)

*Primary Examiner* — Bai D. Vu
(74) *Attorney, Agent, or Firm* — Nixon & Vanderhye P.C.

(57) ABSTRACT

A client server system uses a client subsystem, a server subsystem and an interconnecting data network. The client subsystem client application initiates a secure connection over the network with the server subsystem which includes a server application cooperating with the client application to complete a secure connection with the client application and which transmits output data over such a connection in response to requests for service by the client application. The server subsystem additionally generates a notification, in response to detecting an event in the absence of a secure connection between the server and the client, and transmits the notification to the notification server which forwards the notification over the interconnecting network to the client application.

8 Claims, 8 Drawing Sheets

(56) References Cited

U.S. PATENT DOCUMENTS

| | | | |
|---|---|---|---|
| 6,996,841 B2* | 2/2006 | Kadyk et al. | 726/12 |
| 2001/0018701 A1 | 8/2001 | LiVecchi | |
| 2002/0052968 A1* | 5/2002 | Bonefas et al. | 709/231 |
| 2002/0056008 A1* | 5/2002 | Keane et al. | 709/245 |
| 2002/0138614 A1* | 9/2002 | Hall | 709/225 |
| 2003/0140092 A1 | 7/2003 | Caruso et al. | |
| 2003/0174815 A1 | 9/2003 | Didcock et al. | |
| 2003/0220989 A1 | 11/2003 | Tsuji et al. | |
| 2003/0236924 A1* | 12/2003 | Auffret et al. | 709/318 |
| 2004/0030741 A1 | 2/2004 | Wolton et al. | |
| 2004/0068579 A1 | 4/2004 | Marmigere et al. | |
| 2005/0050329 A1* | 3/2005 | Wilding et al. | 713/171 |
| 2005/0108574 A1* | 5/2005 | Haenel et al. | 713/201 |

FOREIGN PATENT DOCUMENTS

| | | |
|---|---|---|
| GB | 2375936 A | 11/2002 |
| JP | 2003228529 A | 8/2003 |
| WO | WO 02/15523 A1 | 2/2002 |
| WO | WO 02/25893 A3 | 3/2002 |
| WO | WO 02/096130 A3 | 11/2002 |
| WO | WO 02/096138 A1 | 11/2002 |

OTHER PUBLICATIONS

GB Search Report dated Jul. 26, 2004.

De Souza et al., "Supporting Global Software Development with Event Notification Servers", {cdesouza,sdb,redmiles}@ics.uci.edu, cica 2002.

"Notification Server" http:/jerry.csuiuc .edu/~plop/plop98/final submission_submissions/P20.pdf.

De Souza et al., "Using Event Notification Servers to Support Application Awareness Notification Server", http://www.isr.uci.edu/projects/cassius/papers/IASTED.pdf, circa 2001.

* cited by examiner

METHOD AND APPARATUS FOR COMMUNICATING DATA BETWEEN COMPUTER DEVICES

This application is the US national phase of international application PCT/GB2005/001100 filed 23 Mar. 2005 which designated the U.S. and claims benefit of GB 0407388.8, dated 31 Mar. 2004, the entire content of which is hereby incorporated by reference.

BACKGROUND

1. Technical Field

The present invention relates to a method and apparatus of transmitting data between computer devices and, in particular, to a method and apparatus for permitting backend services, which are provided by a single backend system such as a mobile wireless network and which enable controlled access to one or more features of the backend system by (internal or external) application developers, to initiate, in an efficient manner, communications with applications which are using the services.

BACKGROUND OF THE INVENTION

The present inventors have developed a system (hereinafter referred to as a gateway or a platform) whereby a mobile network (or other similar "backend" system) may provide a number of (basic wholesale) services to third party application developers who may then easily develop and deploy new (retail) services to end customers. This provides business opportunities for both mobile network operators and third party application developers.

2. Related Art

For example, most GSM mobile telephone networks have the ability to locate a mobile handset (i.e. a subscriber unit) connected to the network (i.e. when switched on and within range of a suitable base station). However, most such networks do not currently offer this service to end users. This is because the network cannot simply offer it out in an uncontrolled manner to third parties because, for example, of the possibility of a denial of service type attack (in which third parties could constantly request the location of subscriber units until the level of service offered by the network deteriorated on account of excessive loading to the point that the ability of other subscriber units to make and receive telephone calls might be reduced). On the other hand, developing well controlled fully functioning and profitable services which incorporate (to a greater or lesser extent) such a facility is an activity which is often more efficiently done by specialist third party application developers. However this still requires the network operator to control the access to such facilities and doing this on an individual basis for each new proposed application is a relatively slow and inefficient business.

BRIEF SUMMARY

The present inventors have therefore developed a wireless Application Program Interface (API) service gateway to provide the infrastructure to bridge the needs of application developers and network operators. The gateway enables operators to offer commercial wireless API services, such as location, messaging and charging, to the mass-market of developers which in turn enables new applications to be developed and launched cost effectively. The gateway offers a wide range of services to developers which are easy to use, secure and safe.

An important feature of the gateway is that it includes a Service Exposure Engine (SEE) which may be contacted over a standard network such as the Internet by remote devices on which individual applications are running. This provides limited access to the services offered by the network operator to each permitted application. The SEE includes a number of common features which ensure that the connection between an application and the gateway are secure and authenticated and the gateway also includes a mechanism for ensuring that the maximum load which an application may cause to be placed on the network is manageable at all times.

In order to access a network service via the gateway, an application initiates a secure connection with the gateway. Note that the connection is always initiated by the application and not by the gateway. The reason for this is that there is a certain amount of processing which needs to be performed by the non-initiating party to ensure that the initiating party is who it claims to be (ie to ensure proper authentication) among other things. This is done by providing so called "web server" functionality to the gateway. If each application also had to have the capability to cope with setting up connections initiated by the gateway using web server functionality, all of the applications would have to be considerably increased in complexity. If the additional complexity were provided by the gateway developers this would cause additional maintenance problems for the gateway administrators (it is always preferable to avoid situations which require remote support of software installed on remote third party machines). Alternatively, it would place considerable extra burden on the application developers/administrators and this should ideally be minimised wherever possible.

At present therefore, in order for an application to receive data from a service at some unknown time, it must continually contact the service at regular intervals and ask if the service in question has any new data to supply to the application. This intermittent communication method is used widely in data communication systems and generally operates well provided the correct balance is found between contacting the gateway so frequently that it causes excessive loading on the gateway and contacting the gateway so infrequently that there can be an undesirably long delay between some data arriving at a gateway service and it being delivered to the respective application. Unfortunately, in the present case the gateway operators and the application operators whose desires are completely at odds with one another, in that the less frequent the polling the less loading there will be on the gateway but the more likely it is that the application will have to wait for some data, are separate commercial entities and so there is no motivation on the part of either party to try to sacrifice its desires at all.

The present invention seeks to provide a method which to some extent at least resolves the above mentioned conflict without detracting greatly from the design features of the gateway discussed above.

Note that the use of such a gateway is not restricted to the case of mobile telephone networks and the same type of gateway could be applied to any large system which has some basic functions which could be used to generate many diverse end user applications if only these functions could be offered to third party application developers in a straightforward, simple, safe and secure manner.

SUMMARY OF THE INVENTION

According to a first aspect of the present invention, there is provided a system for offering services provided by a first sub-system to one or more application hosting sub-systems via a gateway device, the gateway and the or each application hosting sub-system being arranged to permit the or each application hosting sub-system to initiate a secure and authenticated connection to the gateway via a non-secure data network connection, and the gateway being logically connected to the first sub-system to enable services provided by the first sub-system to be provided to the or each application hosting sub-system, the gateway including notification means for notifying one or more of the application hosting sub-systems that it or they should initiate a secure authenticated connection with the gateway.

Preferably the notifications provided by the notification server do not include any sensitive or valuable data (in the sense that the information could not be mis-used so as to cause damage or inconvenience to any of the parties having an interest in any part of the system if intercepted by or inadvertently mis-directed to a malicious third party over the non-secure data network). Preferably the notifications are completely passive in the sense that they do not include any executable code. Preferably the notifications are simple text files, preferably in the specific form of eXtensible Mark-up Language (XML) files.

A system of this form has the advantage that there is minimal additional complexity required by the application hosting sub-systems compared with the above-described system in which the application hosting sub-systems must continually poll the gateway to see if they have any new messages, etc. waiting for them and yet excessive loading on the gateway is avoided without increasing the maximum delay between a service on the first-subsystem receiving some information for an application and the application receiving that data.

Preferably the notifications specify exactly which service it is that wishes to contact (or more precisely, to be contacted by) the application hosting sub-system. Preferably there is a common interface between the notification server and all of the services provided by the first sub-system and a common interface between the notification server and each of the application hosting subsystems such that the notification server is able to perform source-independent and recipient-independent handling, routing and dispatching of notifications.

Preferably, the common interface between the notification server and each of the services offered by the first sub-system permits a service to specify in respect of an individual notification an identifier identifying the destination application, and identifier identifying the requesting service and one or more handling behaviour parameters. Preferably the handling behaviour parameters may include one or both of the number of attempts which should be made to send the notification in the event of one or more unsuccessful attempts to send the notification and the delay between again attempting to send the notification in the event of one or more unsuccessful attempts to send the notification.

Preferably the notification server is operable to generate different execution threads for controlling the transmission of respective different notifications across the unsecure data network. This has the advantage of enabling the notification server to provide an adequate throughput of notifications for multiple notification producing services despite the possibility that each notification may take a significant amount of time to traverse the network, since many different notifications may be sent "in parallel" if they are sent using different threads.

Preferably the notification server retains notifications for which delivery fails and retries to deliver them after a service-specified or default delay for up to a service-specified or default number of attempts.

The present invention also provides a notification server for use in the system of the first aspect of the present invention described above, and corresponding methods, computer programs and computer program products.

BRIEF DESCRIPTION OF THE FIGURES

In order that the present invention may be better understood, embodiments thereof will now be described, by way of example only, with reference to the accompanying drawings in which.

As those skilled in the art will appreciate, the system described hereinbelow is implemented by computer devices linked to each other by a suitable communications network. Such well known computer devices per se include a CPU, linked data/program storage devices and I/O ports. In particular, computer program code is stored in computer-readable storage media (e.g., magnetic or solid state IC memory devices) and accessed by the CPU for execution in order to cause the described functions to occur as the program code is executed.

DETAILED DESCRIPTION OF A PREFERRED EMBODIMENT

Figure 1:
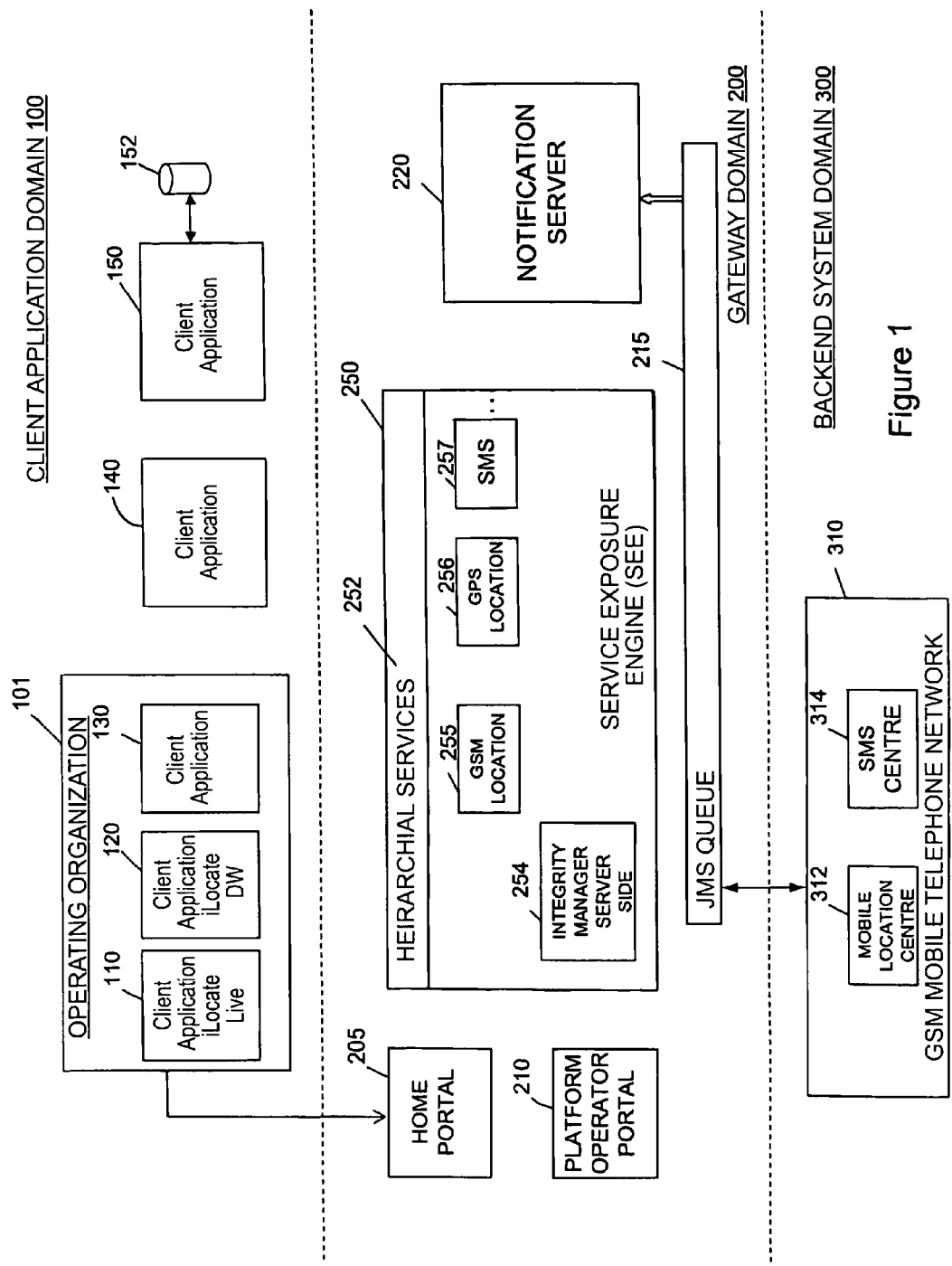
FIG. 1 is a schematic illustration of a system according to an embodiment of the present invention.

Referring to FIG. 1, the system of the preferred embodiment has three domains: a client application domain 100, a gateway domain 200, and a backend system domain 300. The client application domain 100 and the gateway domain 200 are connected by an unsecure data network. In the present embodiment, the gateway domain 200 and the backend system domain 300 are also connected by an unsecure network, however, in alternative embodiments this may typically be a secure network connection.

The client application domain 100 comprises a number of client applications 110, 120, 130, 140, 150 hosted on various third party server machines (not shown) (NB. the client applications will typically behave as both client and server applications in that they will behave as server applications for end user clients contacting them, but they will behave as client applications when contacting the gateway domain 200). In these specific examples shown in FIG. 1, applications 110, 120, 130 are all operated by a single organisation as indicated by the encompassing box 101 with a single customer account with the operator of the gateway domain 200, the significance of which will be explained in greater detail below. Also, as shown in FIG. 1, some of the applications, such as application 150, may access different resources, such as database 152, all of which are considered to fall within the current application domain 100.

The gateway domain 200 comprises the following principal components: a home portal 205 and a platform operator portal 210; a Java Messaging Server (JMS) Queue software component 215; a notification server software component 220 (to be described in greater detail below) and a Service Exposure Engine (SEE) 250. The SEE 250 includes a set of hierarchical service layers 252 and a set of service plug-in modules 254 to 257. The set of hierarchical service layers 252 provide a number of basic services to all of the service plug-ins 254 to 257 including dealing with encryption and decryption of data for transfer over the unsecure network, authentication of the parties communicating with one another over the unsecure network, etc. One of the server plug-ins 254 is an Integrity Manager Server Site (IMSS) plug-in 254 which performs the special function of regulating how individual client applications 110 to 150 are allowed to communicate with SEE 250.

Full details of the IMSS (and the corresponding Integrity Manager Client Side (ICMS) components contained within each client application 110 to 215 can be found in co-pending patent application number EP 01308317.5 (corresponding U.S. Ser. No. 10/488,777 filed Aug. 30, 2002) which is incorporated herein by reference). In brief, the IMSS 254 communicates with a corresponding IMCS in each of the client applications to regulate the frequency with which each client application may contact the SEE 250; the gateway platform operator may use this mechanism to "throttle back" the frequency with which any particular application may contact the SEE in order to reduce the load on the SEE in times of high usage. The mechanism involves a so called "heart beat" in which the respective client application IMCS contacts the IMSS and updates from the IMSS a set of current parameters which specify the frequency with which the current application may contact specified service plug-ins within the SEE (or, in alternative embodiments, they could simply specify the frequency with which the application may contact the SEE— i.e. independently of what actual service plug-in it is desired to contact).

In the present embodiment, the other service plug-ins shown are a GSM location service plug-in 255, a GPS location service plug-in 255, a GPS location service plug-in 256 and a short message service (SMS service plug-in 257). The functionality of the service plug-ins is described in greater detail below.

The home portal 205 and the platform operator portal 210, in the present embodiment, are provided by a web site service which both the gateway platform operator and customers of the gateway may review and, where appropriate, alter details of the business relationship between the gateway operator and the client application apparatus. For example, a particular client application might negotiate with the gateway platform operator to have access to specified services and to make a maximum number of requests of the service within a particular time period for an agreed price. Should the current application operator then require to increase the maximum number of requests which it would like to be able to make of a particular service plug-in within the SEE in a particular time period, then this can be altered using the home portal provided there are suitable arrangements in place for permitting the price charged to the current application to be increased accordingly. Similarly, the platform operator portal can be used to identify and amend all of the details of each customer account should the customer contact the gateway operator by some alternative mechanism (e.g. by email) to request such a change in the contractual relationship between the parties.

The backend system domain 300 is, in the present embodiment, a GSM mobile telephone network 310 which includes a mobile location centre 312 and an SMS centre 314 the functionality of which will be described in great detail below with reference to FIGS. 2 and 3, as well as the various features commonly associated with a mobile network infrastructure such as base stations and associated broadcasting masts 305 interconnected by a data network and interfaced with various other telecommunications and data networks.

As those in the art will appreciate, the above described domains are physically realized by computer-based hardware (e.g., servers, switches, networks, etc.) executing computer program code (instructions) stored in computer readable storage media.

As an example of the operation of the system shown in FIG. 1, there will now be described with reference to FIG. 2, the operation of client application 110 of FIG. 1. Current application 110 is hereinafter referred to as iLocate. The iLocate application 110 enables a user (such as, for example, "Dad") 9 to establish the location of a further user, (for example "Dad"'s daughter "Kate") 19, by her GSM mobile phone 20 using his personal computer 10 connected to the iLocate application 110 via the internet. In order to do this, the client application iLocate 110 will use the GSM location service plug in 255 and/or the GPS location service 256 to find the location of Kate's handset 20 and it will also use the SMS service plug in 257 in order to send and receive SMSs to and from Kate's handset 20. The service plug ins 255, 256 and 257 in turn communicate with the backend system 300 which transmits and obtains data to and from Kate's handset 20 via a base station mast 305.

In order to determine the location of a mobile handset device, the GSM and GPS location service plug-ins 255, 256 in essence simply contact the mobile location centre 312 and ask this to obtain the information. The way in which the Mobile location centre obtains the information is not relevant to the present invention and will not be described in detail. Briefly, as indicated by the names of these services, for the GSM service the mobile location centre determines which cell the user is in and by associating this with the geographical region which the cell covers gives an approximate location of the mobile; for the GPS service (which is only available when the handset to be located includes a GPS receiver) the mobile location centre sends an SMS message which causes the handset to automatically lookup its location using its onboard GPS receiver and then send an SMS back to the mobile location centre with details of the determined position. The significance is that the back end system operating the mobile location system trusts the gateway to ensure that it will not overload the mobile location centre nor use its services inappropriately.

Figure 2:
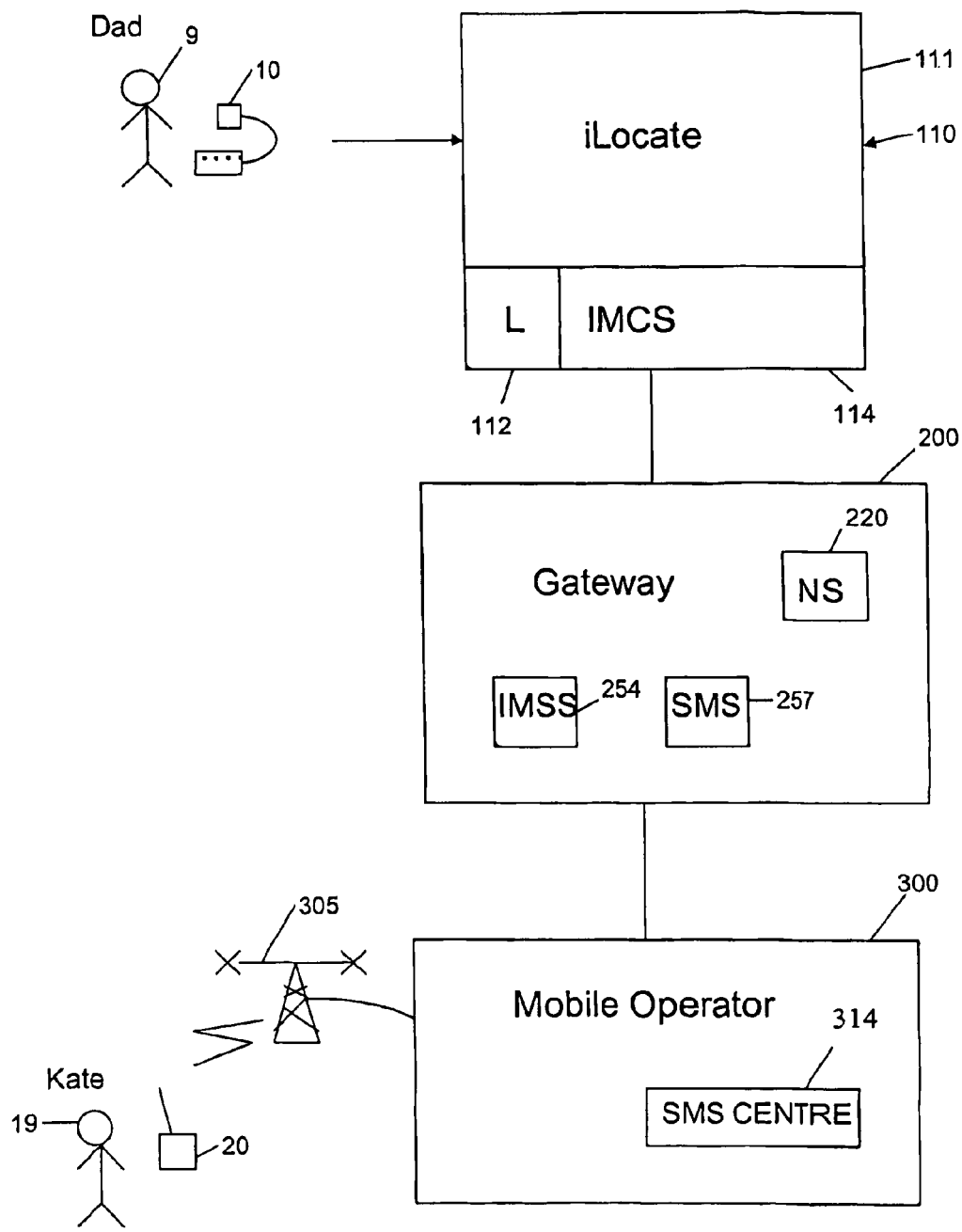
FIG. 2 is a schematic illustration of an example application employing the system of FIG. 1 to provide a location end-user service.
Figure 3:
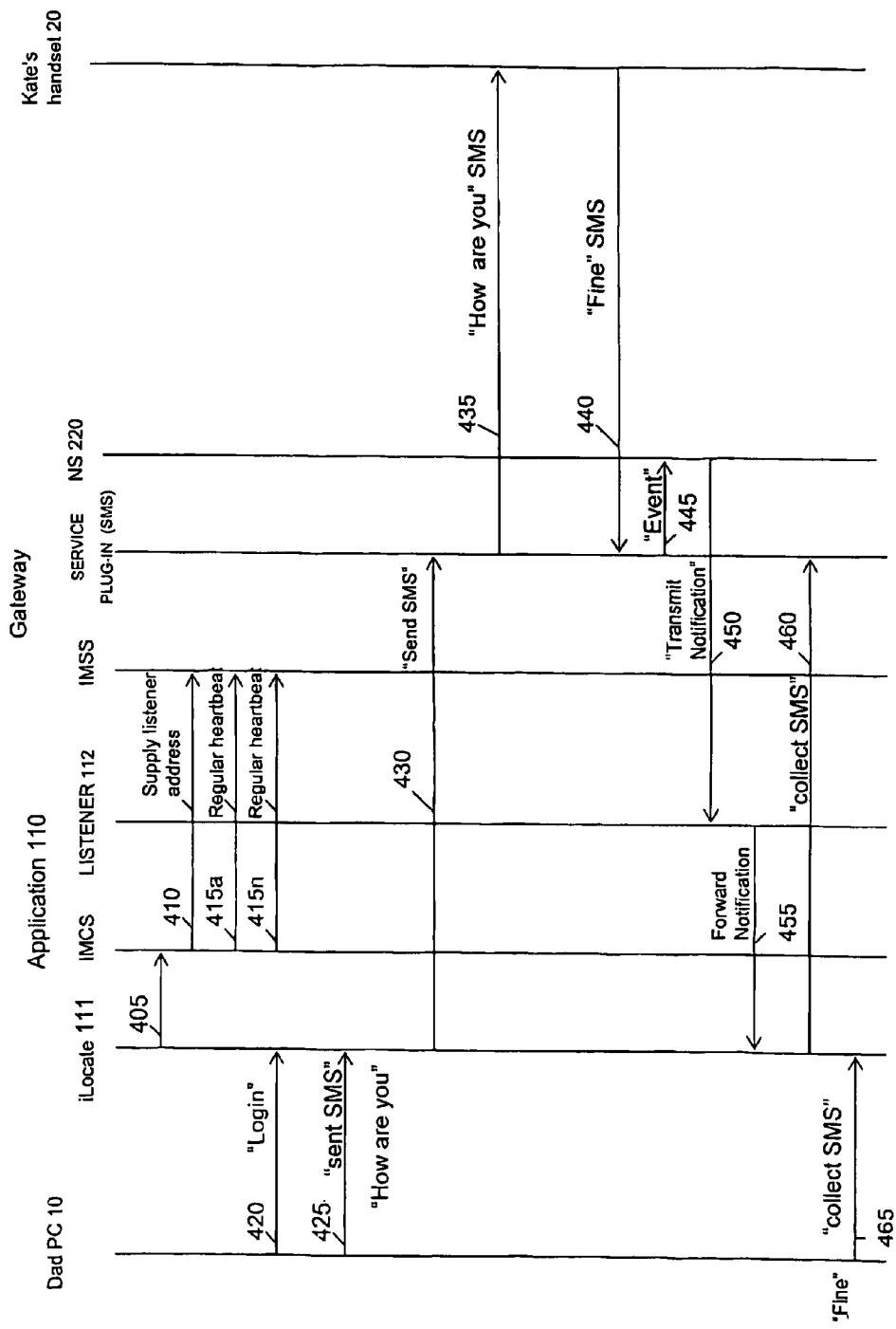
FIG. 3 is a signal diagram showing the signals exchanged between various elements of the system of FIGS. 1 and 2 in providing the location end-user service referred to above.

Referring now to FIG. 3, the signals exchanged between the various components illustrated in FIG. 2 in order to permit user 9 (Dad) to transmit and receive an SMS to and from user 19 (his daughter Kate) are described.

In order to enable such an exchange of SMS's, iLocate application 110 initiates a connection with gateway 200. It does this by firstly sending a request, initiation signal 405 from the developer controlled portion of the iLocate application 111 to the Integrity Manager Client Side (IMCS) module 114 which is provided by the platform operator. The IMCS 114 upon receipt of the initiation request signal 405 generates a further initiation signal 410 which is transmitted to the Integrity Manager Server Side (IMSS) service plug-in module 254 located within the gateway domain 200. Signal 410 is a fully authenticated and encrypted communication between the IMCS 114 and the IMSS 254 which takes advantage of the set of hierarchical service layers 252 provided as part of the service exposure engine 250. During this communication the IMCS 114 provides various details about the iLocate application 110 to the IMSS including, in the present embodiment, details about a listener address (i.e. the server's Internet Protocol (IP) address and port number) on which the iLocate application 110 listens for notification messages provided by the notification server 220. Additionally, as part of the communication 410 the IMSS 254 communicates to the IMCS 114 details about the frequency with which it should initiate a heart beat communication.

Upon completion of the communication 410, the IMCS 114 initiates a heart beat communication 415*a*. This is again a secure authenticated communication taking advantage of the set of hierarchical service layers 252 which ensure that the calling party is indeed iLocate application 110 and not an impostor and that the IMCS is truly authorised to contact IMSS 254 at that time. The primary function of the regular heart beat for communication 415*a* (and subsequent heart beat communications 415*n*) is to specify the frequency with which the iLocate application 110 may request a service from any of the service plug-ins 255-257 with which the application 110 is duly registered. (Registration being performed by the home portal 205 or the platform operator portal 210). Subsequent heart beat communications 415 occur at regular intervals and are used as a mechanism for throttling back the rate at which application 110 may contact the service exposure engine 250 as well as providing a mechanism for ensuring that both the service exposure engine 250 and the application 110 (as well as the interconnecting data network) are still functioning correctly. Full details of the heart beat communication can be found in co-pending European patent application number EP 01308317.5.

Having in this manner established a line of communication between application 110 and gateway 200, application 110 then awaits user requests. Thus, upon receipt of a log-in request communication 420 from PC 10, application 110 will provide PC 10 with access to its web site from which various services are offered to the user ("Dad") of PC 10. Subsequent to logging in, the user of PC 10 selects from the web site provided by application 110 the option to send an SMS signal with the inserted text "How are you?" which the user specifies as wanting to be sent to a mobile telephone identified by its mobile telephone number which causes a send SMS signal 425 to be transmitted from the PC 10 to the iLocate application 110.

Upon completion of the send SMS communication 425, application 110 tries to initiate a send SMS communication 430 with the SMS plug-in 257. In order to achieve this, a number of lower level activities are performed for details of which the reader is referred to co-pending European patent application number EP 01308317.5, but these include checking with the IMCS 114 that application 110 is currently entitled to initiate such a connection as well as negotiating the set of hierarchical service layers 252 within the service exposure engine 250. Once communication 430 has been successfully completed SMS service plug in 257 initiates a further send SMS communication 435 to handset 20 (via various intermediaries including the SMS centre 314 and mobile network infrastructure 305).

In the present example, upon receipt of the SMS, the user ("Kate") of handset 20 wishes to send a response SMS. Note that in the present embodiment SMS service plug in 257 has only a single telephone number associated with it to which all incoming SMS text messages must be addressed. The SMS service plug-in 257 in the present embodiment, keeps a record of destination telephone numbers to which it has previously sent text messages and uses the caller ID included in the text message to determine which application the received SMS is supposed to be delivered to. In alternative embodiments SMS service plug in 257 could have an arbitrarily large number of mobile phone numbers to which incoming SMSs may be directed or it may include an alternative identification mechanism for more explicitly specifying to whom the incoming SMS should be delivered.

Thus in the present example, handset 20 generates a reply SMS ("fine") which is transmitted as communication 440 from handset 20 to SMS service plug-in 257 via the same intermediaries as used in the send SMS communication 435.

Upon receipt of the reply SMS 440, service plug-in 257 "drops" an "event" on to the JMS Queue 215, which event specifies that a notification is to be sent to application 110 requesting it to contact the SMS service plug-in 257. Subsequently, the notification server 220 takes the event off the JMS Queue and processes it (in a manner to be described in greater detail below). The combination of the dropping of the event onto the JMS Queue and its subsequent retrieval from the JMS Queue by the notification server 220 constitutes event communication 445 as illustrated in FIG. 3.

As a result of the processing performed by notification server 220, the notification server 220 initiates a simple (unauthenticated and unencrypted) TCP/IP connection 450 with listener 112 and transmits over this connection a notification (the nature of which will be described in greater detail below) to listener 112.

Upon receipt of the notification, listener 112 forwards the notification via forward notification communication 455 to a notification processing module (not shown) within the main (client application specific) part 111 of the application 110 which processes the notification and thereby establishes that it should attempt to contact the SMS service plug-in 257.

Application 110 therefore attempts to establish a collect SMS communication 460 (in a corresponding manner to that in which send SMS communication 430 was established); note that in the present embodiment the notification does not specifically specify that the purpose for which the application 110 should contact the SMS service plug-in 257, rather the notification is simply of a callBack type which causes the application 110 to therefore simply contact service plug in 257 and to inform the service plug-in that it is doing so as a result of having received a notification. On establishing the collect SMS communication 460 the service plug-in 257 passes to application 110 any data which it has for the application 110 including the SMS which it has received from handset 20.

As a result of receiving the reply SMS, the application 110 updates the information which it displays to PC 10 on its web site and when PC 10 next refreshes i.e. reloads the web page from application 110, it will be notified that there is an SMS waiting for it and this can be collected by selecting an appropriate link from the web page in the normal manner.

Method Performed by iLocate Application 110

Figure 4:
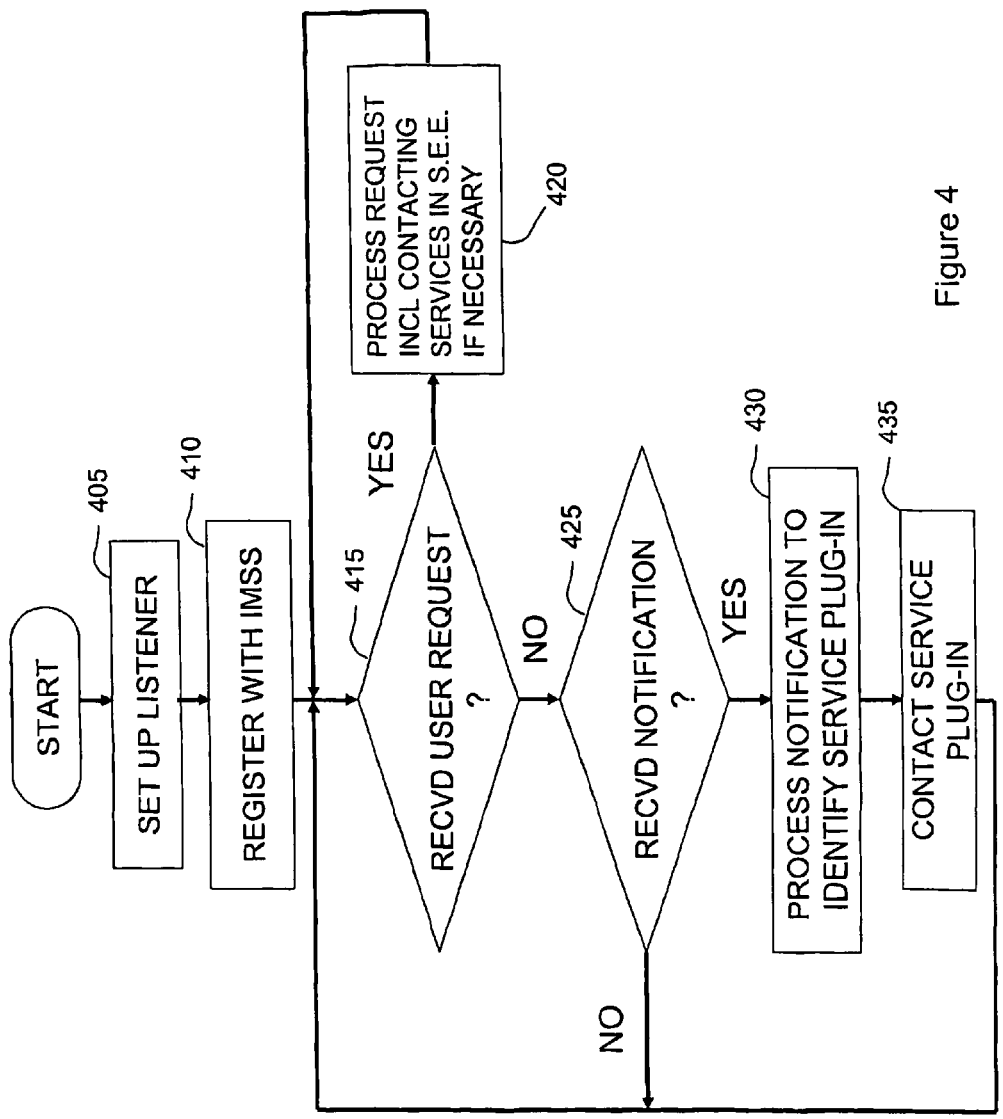
FIG. 4 is a flow chart illustrating the steps performed by a client application in interacting with end users and a gateway between the client application and a backend system.

Having described an example set of interactions between the various elements of the system shown in FIGS. 1 and 2 with reference to FIG. 3, there will now be described more generally the steps performed by application 110 when operating normally within the system of FIG. 1 with reference to FIG. 4. Thus, upon commencement of the method, flow passes to step 405 in which the application performs any initialisation including, importantly, setting up listener 112. As mentioned above listener 112 is a simple programming construction which enables third parties to set up a TCP connection with the listener provided the correct IP address and port number are given. As will be well understood by those skilled in the art, by specifying that only simple text documents may be transmitted to the listener in this way it is possible to establish such a listener even behind a fairly vigorous fire wall such as is often put in place by organisations wishing to protect their internal network against unauthorised access via the internet.

On completion of step 405, the method proceeds to step 410 in which IMCS 114 sets up a communication with IMSS 254, in order to register the application with the gateway 200 in the manner described above and also described in greater detail in co-pending application number EP 01308317.5.

On completion of step 410, the method proceeds to step 415 in which it is determined whether or not the application has received a user request for a service from application 110. If a request is received the process moves to step 420 in which the request is duly processed; if necessary in order to fulfil this request, this includes contacting one or more services in the service exposure engine 250. On completion of step 420 the method returns to step 415.

If in step 415 it is determined that there is no receiver request waiting to be processed the method proceeds to step 425 in which it is determined whether or not the application has received, via its listener 112, a notification from the notification server 220. If no such notification has been received the method loops back to step 415 and continues thereafter to await either a new user request or a new notification.

If in step 425 it is determined that a new notification has been received, the method proceeds to step 430 in which the notification is processed to identify which service plug-in 255-257 initiated sending of the notification.

On completion of step 430, the method proceeds to step 435 in which the service plug-in identified in step 430 is contacted. Upon contacting the relevant service plug-in the application then performs any necessary steps consequent upon the information it receives from the service plug-in. For example, in the case of the SMS plug-in 257 it is likely that a new SMS text message has been received for onward transmission by application 110 to one of its users. Similarly, if the relevant service plug-in is the GPS location plug-in 256 then it is likely that the GPS location plug-in 256 has recently received information as to the whereabouts of a mobile device as previously requested by a user of application 110.

Upon completion of step 435 the method loops back to step 415 where it awaits further user requests or notifications for appropriate processing.

Method Performed by Service Plug-Ins 255-257

Figure 5:
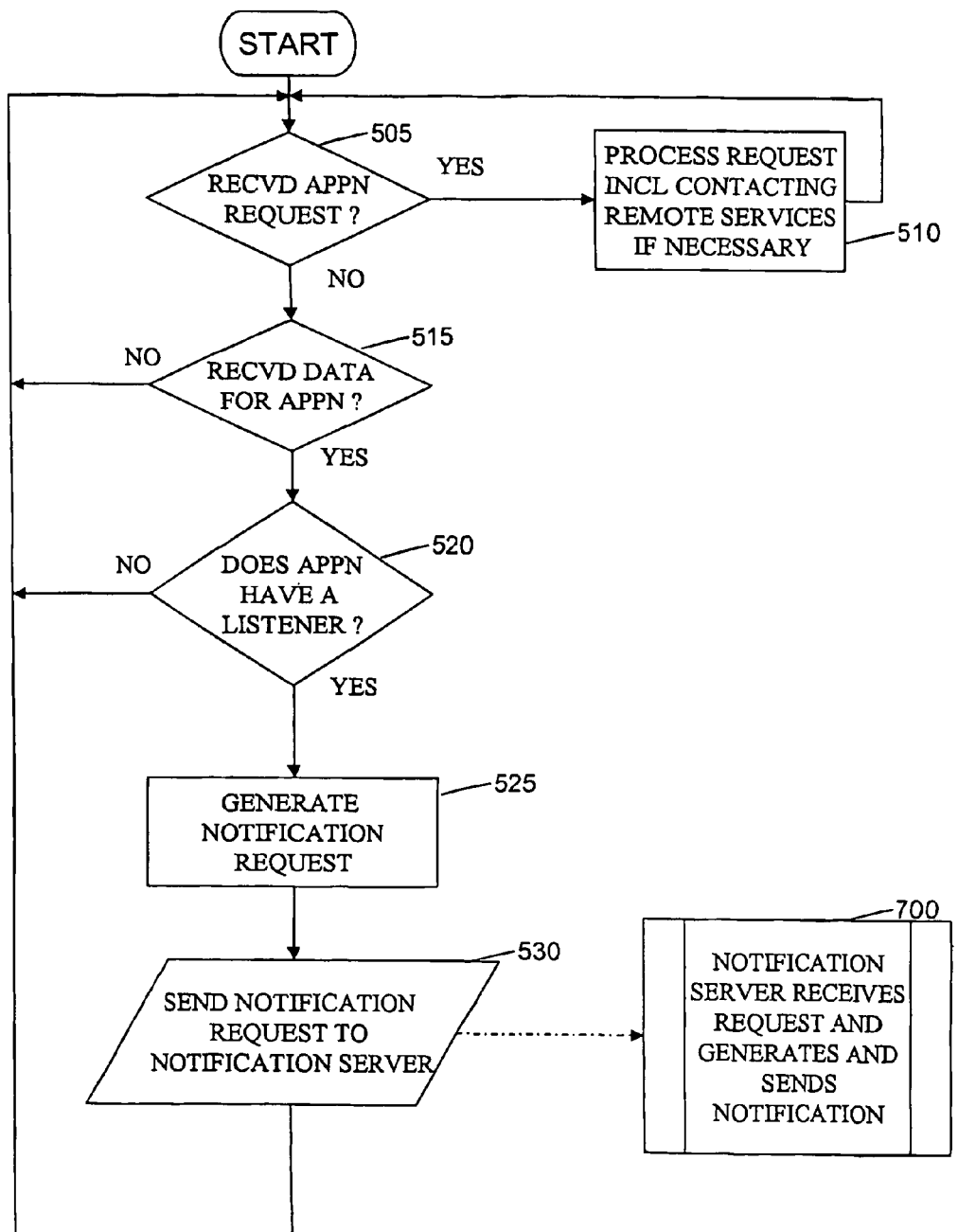
FIG. 5 is a flow chart illustrating the steps performed by a service plug-in in a gateway between a client application and a backend system.

Referring now to FIG. 5, the basic method of operation of a service plug in (such as any one of service plug-ins 255-257) is now described. Upon initiation of a service plug-in the method proceeds to step 505 in which it is determined whether a new service request has been received from an application such as application 110 with which the service plug-in is registered. If so, the method proceeds to step 510 in which the request is processed. The process includes checking that the request is valid and, if necessary in order to fulfil the request, the service plug-in contacts a remote service such as one of the services 312, 314 provided, by backend system 310. On completion of 510 the method loops back to step 505.

If at step 505 it is determined that no new request has been received from an application then the method proceeds to step 515 in which it is determined whether the service plug-in has received any data for one of the applications with which it is registered (such as application 110) (NB "data" here is meant to refer to any sort of event of which the service plug-in is aware and about which it considers one of the applications with which it is registered should be notified). If it is determined that no such data has been received then the method loops back to step 505. Otherwise the method proceeds to step 520 in which it is determined whether or not the application to be notified of the newly received data has a listener registered with the service exposure 250 if the application in question does not have a suitable listener the method loops back to step 505. In this case the service plug-in will simply wait until the application in question next attempts to contact the service plug-in and it will notify the application of the data or other event automatically at that time.

If, however, it is determined in step 520 that the application in question does have a suitable listener then the method proceeds to step 525 in which the application generates a notification request. In the present embodiment, the notification request takes the form of a message object as used in the well-known Java Messaging Service (JMS).

The method then proceeds to step 525 in which the generated notification request message is sent to the notification server using the Java Messaging Service. In particular, in the present embodiment, this is done by the service plug-in placing the notification request message onto the JMS Queue 215 from which the notification server 220 subsequently consumes the notification request message. Upon consumption of the notification message by the notification server, the notification server processes the request and generates and transmits to the appropriate application listener a notification in the form of an XML document. The operations performed by the notification server are illustrated in FIG. 5 by means of the sub-routine 700. The indirect (de-coupled) connection between the service plug-in and the notification server is illustrated by the dotted line in FIG. 5 which indicates that the connection is an asynchronous one via the JMS Queue 215.

Upon completion of step 525, the method of the service plug-in loops back to step 505. Note that the steps performed in sub-routine 700 are described in greater detail below with reference to FIG. 7a to 7d.

Notification Server 220

Figure 6:
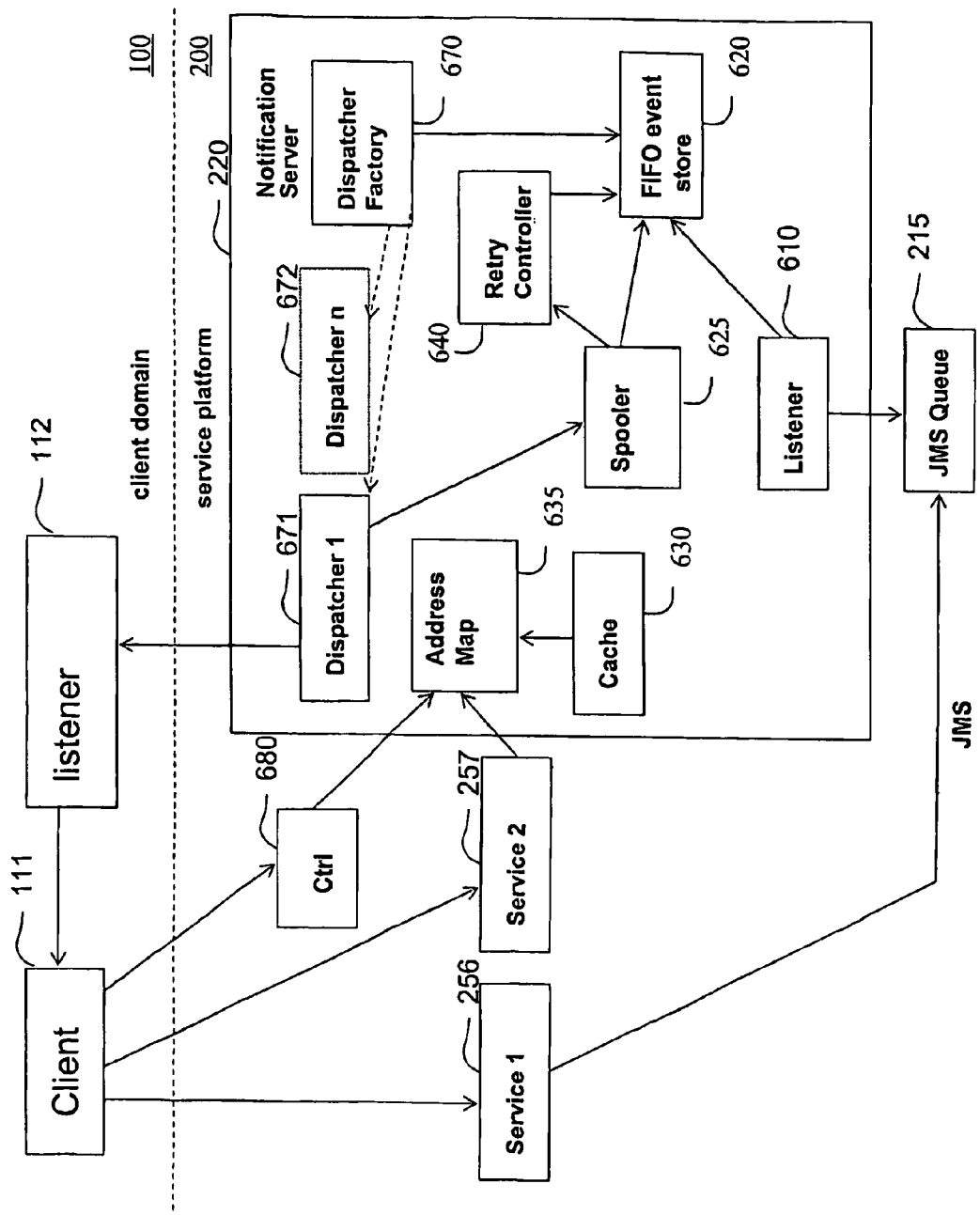
FIG. 6 is a schematic illustration of the principal functional structures of the notification server of FIG. 1.

Referring now to FIG. 6, the architectural software features or modules of the notification server 220 in the present embodiment are now described.

A listener module 610 performs the function of taking off messages from the JMS Queue 215 which are addressed to the Notification server 220 and stores them as events (which may be modified in format from the messages as received from the JMS Queue 215 in minor ways) in a First In First Out (FIFO) event store 620.

A Spooler module 625 takes events stored in the FIFO event store 620 and offers them to "Dispatchers" which periodically call on the spooler to see if there are any outstanding events with the Spooler 625. The Spooler communicates with a Cache module 630 which in turn communicates with an Address Map store 635, in order to enable the Spooler to find out the IP address and port number of the listener of an application for which an event to be dispatched is destined (the Cache 630 and Address Map 635 operate in the normal manner such that if the desired address details are not in the Cache, the Cache requests these from the Address Map, passes the details to the Spooler 625 and stores a copy of these for a predetermined period of time to enable a subsequent query for the same details to be answered directly by the Cache without having to contact the Address Map 635). The Spooler 625 also communicates with a Retry Controller module 640 which receives events which a dispatcher has tried unsuccessfully to dispatch and determines if they should be retried at some subsequent point in time; if so, they are stored until such time and then re-submitted to the FIFO event store 620.

The Notification Server 220 also includes a Dispatcher Factory module 670 which monitors the FIFO event store 620 and if it detects that there are new events in the FIFO event store which require dispatching, then it generates a new Dispatcher object 671, 672. Each Dispatcher object 671, 672 runs in its own thread of execution and is responsible for only a single notification at any one time so that network delays do not add cumulatively so as to delay subsequent notifications from being sent until preceding notifications have been successfully sent (or tried and failed). Once a Dispatcher 671, 672 has finished processing a notification (either by successfully sending it or by reporting back to the Spooler 625) it checks with the Spooler 625 to see if there is an outstanding notification to be dispatched, if so it takes it and tries to dispatch it, otherwise it destroys itself; this automatic pool-sizing behaviour balances dispatch capacity against the current demand.

Also shown in FIG. 6 is the mechanism by which Applications such as the iLocate Live application 111 can register their Listener 112 socket ID (ie IP address and port number) with the Notification server. As shown in FIG. 6, in the present embodiment, this can be done either by the application notifying a service plug-in (eg SMS Service plug-in 257) directly which then passes the address details to the Address Map 635 itself, or alternatively, the application contacts a common point of access Control module 680 with its Listener address details which are then passed by the Control 680 to the Address Map 635.

Overview of Operation of Notification Server

The overall operation of the Notification Server may thus be described as follows. The Dispatcher factory 670 monitors the FIFO event store 620 and when it determines that there are excess events awaiting dispatch it starts a new Dispatcher 671, 672. As mentioned above, Dispatchers 671, 672 run in their own thread of execution; this is necessary because network delays may delay individual dispatch operations for extremely long periods of time (several seconds). Dispatchers 671, 672 call on the Spooler 625 to give them an event for dispatch; if the Spooler 625 reports that there are no events waiting the Dispatcher 671, 672 kills itself.

The client application developer sources an XML-aware listener from one of the many suppliers who provide such components and integrates it with the rest of the application. The developer understands that all events from the service platform will conform to one standard form (e.g. service ID, event type, event parameter).

In operation, the following steps are performed:

1) The client, authenticated to the service platform by a unique ID, reports its listener's address (IP address and port) either via a common point of access 680 or via any service 256, 257.

2) The client listener's [ID+address] is submitted to the Address Map 635.

3) The client makes use of multiple services 256, 257 via their APIs.

4) An event occurs and the relevant service 256, 257 produces an event which is sent to the Notification Server event queue 215. The event incorporates the ID of the client 110 for which it is intended.

5) The Listener 610 retrieves the event and places it in the FIFO (first-in-first-out) event store 620.

6) A Dispatcher 671, 672 calls on the Spooler 625 to serve it with an event.

7) The Spooler 625 takes the next event off the FIFO event store 620.

8) The Spooler 625 extracts the client ID and queries the Cache 630 for an address. The Cache 630 queries the Address Map store 635 if necessary. The Spooler 625 supplies the event and the delivery address to the Dispatcher 671, 672. The Dispatcher translates the event into an XML document and attempts to deliver it to the client listener 112.

9) Assuming the first attempt to deliver fails, the Dispatcher 671, 672 reports that the delivery has failed.

10) The Spooler 625 submits the event to the Retry Controller 640 which discards the event (if it has reached it's retry limit) or holds it for a period of time (the retry period).

11) Once the event's retry period has elapsed, the Retry Controller 640 submits it to the FIFO event store 620.

12) A Dispatcher 671, 672 calls on the Spooler to serve it with an event.

13) The Spooler 625 takes the next event off the FIFO event store 620.

14) The Spooler 625 extracts the client ID and queries the Cache 630 for an address. The Cache 630 queries the Address Map store 635 if necessary. The Spooler 625 supplies the event and the delivery address to the Dispatcher 671, 672.

15) The Dispatcher 671, 672 translates the event into an XML document and delivers it to the client listener 112.

16) The Dispatcher 671, 672 calls on the Spooler 625 to serve it with an event. If the Spooler responds indicating that there are no further events queued the Dispatcher 671, 672 kills itself.

Variations on this process allow the Notification Server 220 to provide events with different retry attempt limits, retry periods, persistence, etc. The form of the event record used by services to submit events (step 4 above) in the present embodiment incorporates place-holders for indicating the required event handling behaviour.

The Notification Server 220 may detect failure of delivery and alert the client owner by alternative means (e.g. email).

On receipt of the notification, the listener 112 interacts with the client application 111 which takes appropriate action (typically invoking a call into the server on the appropriate service API, e.g. to retrieve incoming SMS messages).

A test method is also offered in the present embodiment from the common point of access 680 or via any service 255, 256, 257. On request, a test event is produced. The test event is handled as per any other event and is delivered to the appropriate registered listener.

The client 111 is able to detect failure of the event delivery mechanism by lack of delivery of the test event notification.

Detailed View of Operations of Specific Modules of the Notification Server 220

Referring now to FIGS. 7a to 7e, the specific steps taken by five significant modules/objects within the Notification Server 220 are now described.

Method of Listener Module 610

Figure 7A:
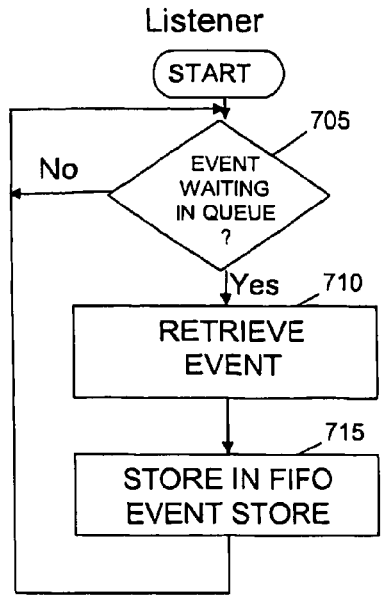
FIGS. 7a to 7e are flow charts of the steps performed by five significant modules/objects of the notification server of FIGS. 1 and 6.

Referring firstly therefore to FIG. 7a, the method performed by the Listener module 610 starts, after initiation of the method, at step 705 in which it is determined whether or not there is a new message in the JMS Queue 215 addressed to the Notification Server 220. If there is no such message waiting then the method continuously loops back to step 705 until such a message is detected.

If at step 705 a message addressed to the Notification Server 220 is detected, then the method proceeds to step 710 in which the message is retrieved from the JMS Queue. Upon completion of step 710 the method proceeds to step 715 in which the retrieved event is stored in the FIFO event store 620. In the present embodiment this is done by simply taking the message object as retrieved from the JMS Queue 215 and storing it in an unmodified manner. However, in alternative embodiments, the significant contents of the message could be read and placed into an alternative format (eg a different Java object) and then stored in this modified format in the FIFO event store. Upon completion of step 715, the method loops back to step 705 and awaits a further message for processing.

Method of Dispatcher Factory Module 670

Figure 7B:
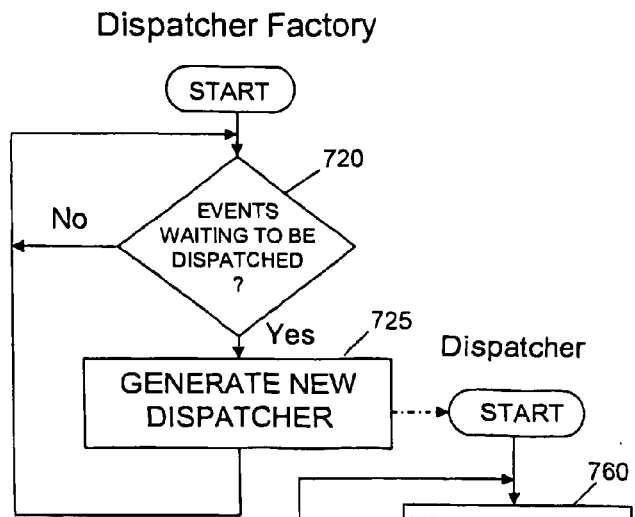

Referring now to FIG. 7b, the method performed by the Dispatcher Factory 670 proceeds, after initiation of the method, to step 720 in which it is determined if there are any events in the FIFO store 620 waiting to be dispatched. If there are no such events waiting to be dispatched then the method loops back continuously to step 720 until such an event to be processed is detected in FIFO store 620.

If an event is detected in FIFO store 620 then the method proceeds to step 725 in which a new Dispatcher object is generated. In the present embodiment, upon completion of step 725 the method loops back to step 720 and again looks to see if there is an event waiting to be dispatched. This means in the present embodiment that if the event has still not been retrieved from the FIFO store by the spooler by the time the method returns to step 720 one or more further Dispatcher objects could be generated even though only one is actually required. This will not cause a problem because such excess dispatcher objects will simply kill themselves in due course. However, more complicated methods could be used to prevent this from happening, such as introducing a small delay after generating a dispatcher before returning to step 720 or checking to see whether a dispatcher has already been generated in respect of a particular event, etc. The dotted line between step 725 of FIG. 7b and the start step of FIG. 7d represents the instantiation of a new Dispatcher object whose method of operation is illustrated in FIG. 7d.

Method of Spooler Module 625

Figure 7C:
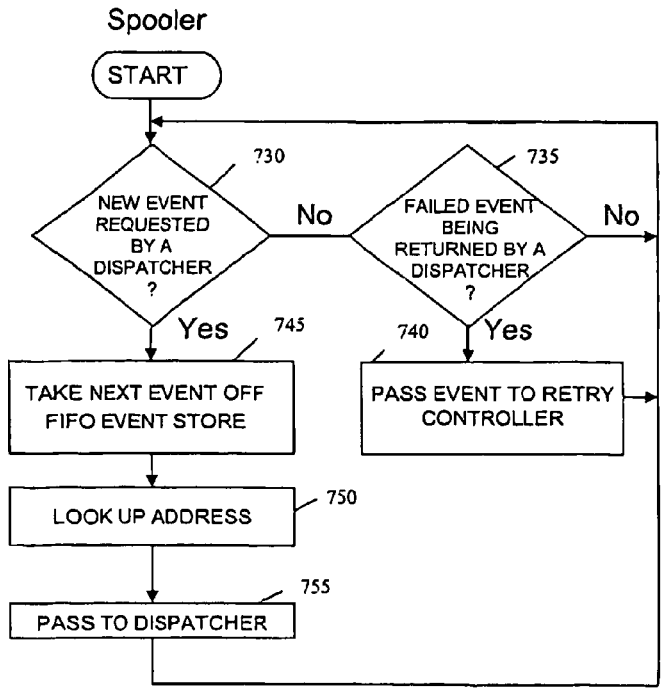
Figure 7D:
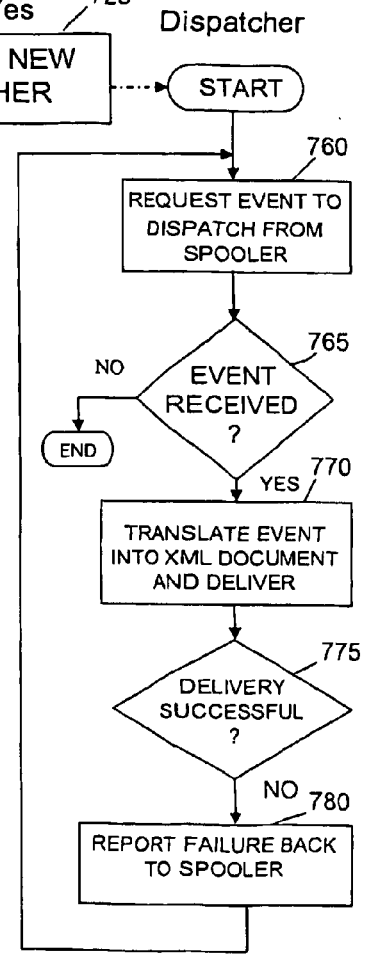

Referring now to FIG. 7c, the method performed by the Spooler module 625, after initiation of the method, proceeds to step 730 in which it is determined whether a dispatcher has requested a new event for dispatch to a client application (such as application 110). If no such request by a dispatcher object is detected then the method proceeds to step 735 in which it is determined whether a dispatcher is attempting to return a failed event (ie an event which the dispatcher has tried and failed to successfully dispatch to the appropriate listener). If yes then in step 740 the Spooler 625 takes the failed event and passes it to the Retry controller 640. Otherwise the method loops back to step 730 and waits for a dispatcher to contact it either to receive a new event to be dispatched or to return a failed event.

If at step 745 it is determined that there is a free dispatcher awaiting a new event to be dispatched, the method proceeds to step 745 in which the next event to be dispatched is taken off the FIFO store 620 (note that even though it is not explicitly shown in FIG. 7c, if there are no events awaiting dispatch in the FIFO store then step 750 is skipped and at step 735 the Dispatcher is informed that there are no waiting events whereupon the dispatcher simply terminates).

Upon completion of step 745 the method proceeds to step 750 in which the address of the listener to which the event is destined to be transmitted is looked up from the cache (or the address map via the cache if necessary) and then the method proceeds to step 755 in which the event is passed to the Dispatcher which then attempts to dispatch the event appropriately. Upon completion of step 755 the method loops back to step 730 and again waits for a dispatcher to contact it either to receive a new event to be dispatched or to return a failed event.

Method of Dispatcher Object 671, 672

Referring now to FIG. 7d, the method performed by each Dispatcher object 671, 672, after it has been instantiated (by the Dispatcher Factory module 670 at step 725), proceeds to step 760 in which the Dispatcher 671, 672 contacts the Spooler 625 to request a new event to be dispatched. At step 765 the Dispatcher determines whether it has received a new event for dispatch from the Spooler 625 or whether the Spooler has reported that it does not currently have an event awaiting dispatch. If the latter is the case (ie that there is no event awaiting dispatch) then the Dispatcher object self-terminates (this ability to self terminate is a standard feature in Java and other object orientated languages and prevents unused objects from taking up computing resources).

If, however, in step 765 it is determined that the Dispatcher has been given a new event to dispatch, then the method proceeds to step 770 in which the Dispatcher generates, from the information contained in the event passed to it by the Spooler, an XML document which forms the substance of the notification to be delivered to the client application; after generating the XML document, the Dispatcher then attempts to transmit the notification to the Listener using the address details passed to the Dispatcher by the Spooler at the time of passing it the event.

Upon completion of step 770, the method proceeds to step 775 in which it is determined whether the delivery was successful. If the delivery was successful, the method loops back to step 760 to request a further event for dispatch. If, however, the delivery was unsuccessful for some reason then the method proceeds to step 780 in which the unsuccessfully delivered (ie the failed) event is passed back to the Spooler (which in turn will pass the failed event to the Retry Controller 640). Upon completion of step 780 the method again loops back to step 760.

Method of Retry Controller Module 640

Figure 7E:
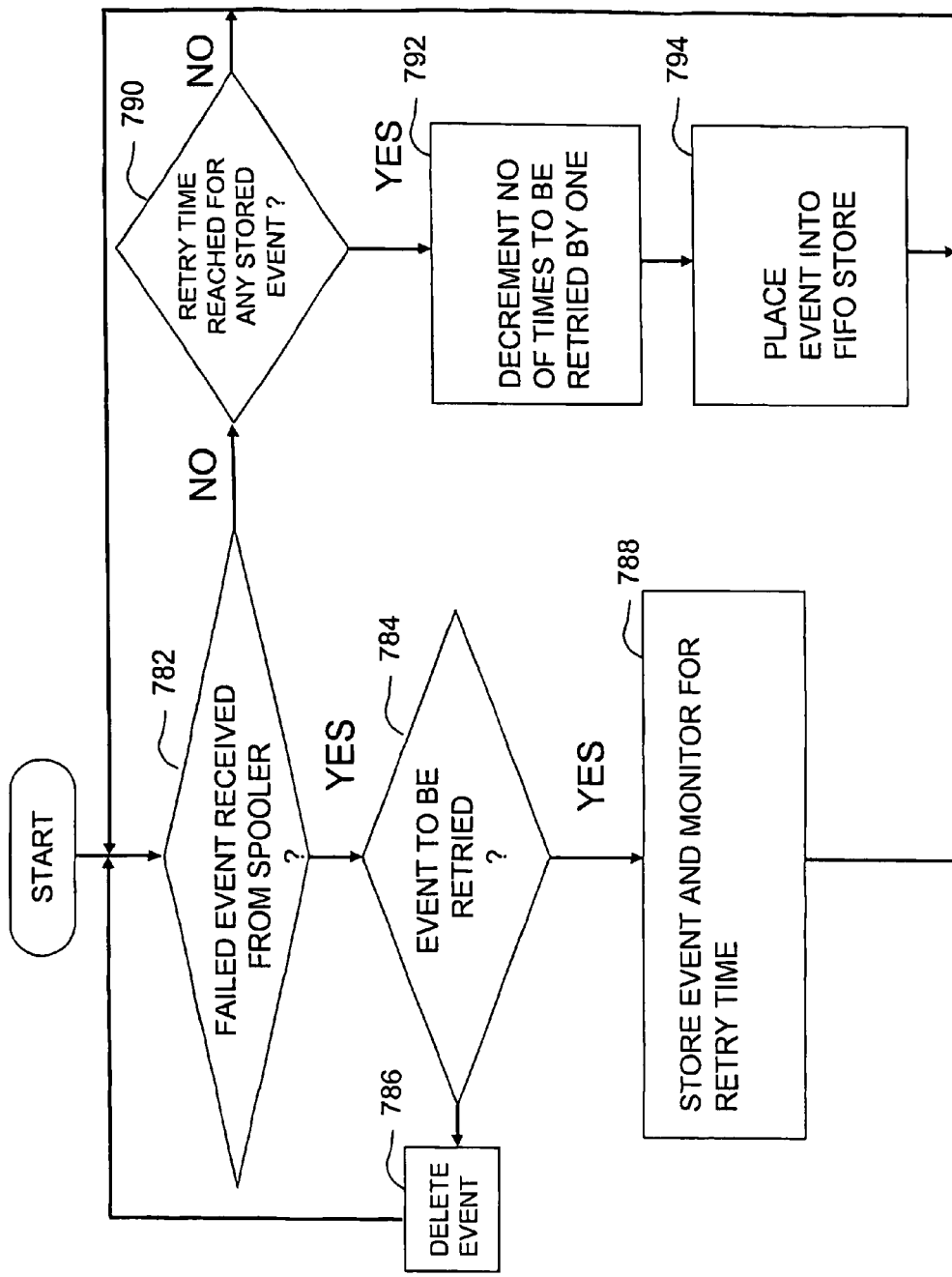

Referring now to FIG. 7e, the method performed by the Retry Controller module 640, after initiation of the method, proceeds to step 782 in which it is determined if a failed event has been passed to it from the Spooler 625. If so, the method proceeds to step 784 in which it is determined if the event is one which is to be retried. In the present embodiment this is determined by reading a retry parameter associated with the event to see if it has value zero. The retry parameter specifies the number of times which the event is to be retried, in the event of its failure to be delivered, and may take any integer value between zero, indicating that it is not to be retried at all, and some predetermined maximum value; the retry parameter is first set by the service plug-in originally generating the event which is placed onto the JMS Queue 215.

If it is determined in step 784 that the event is not to be retried, the method proceeds to step 786 in which the event is simply deleted by the Retry Controller and the method loops back to step 782. Alternatively, if it is determined in step 784 that the event is to be retried, then the method proceeds to step 788 in which the event is stored by the Retry Controller and the time for retrying the event is calculated and monitored. In the present embodiment, the time for retrying the event is calculated by reading a retry interval parameter and adding this to the current time given by the system clock (not shown). After calculating this retry time, the method returns to step 782.

If at step 782 it is determined that no failed event has been received then instead of proceeding to step 784 the method proceeds to step 790 in which it is determined if the (earliest)

retry time for the event(s) awaiting retrial has been reached or passed. If not then the method loops back to step 782. Otherwise, the method proceeds to step 792 in which the retry parameter of the event whose retry time has been reached or exceeded is decremented by one. Upon completion of step 792 the method proceeds to step 794 in which the event is then placed into the FIFO store 620 from which it will subsequently be picked out again and retried by the Spooler 625 in the manner previously described. Upon completion of step 794 the method of the Retry Controller 640 loops back to step 782.

Notification Format

In the present embodiment, each notification, as sent over the unsecure network between the gateway domain 200 and the application domain 100, takes the form of an extensible Mark-up Language (XML) document validatable by the following Document Type Definition (DTD) file:

```
<!ELEMENT event (parameter*)>
<!ATTLIST event
    appAccID  CDATA  #REQUIRED
    serviceID CDATA  #REQUIRED
    type      CDATA  #REQUIRED
>
<!ELEMENT parameter (#PCDATA)>
<!ATTLIST parameter
    name      CDATA  #REQUIRED
>
```

Which in essence states that a notification which is provided in the form of an XML document validatable by this DTD will be an "event" which can contain zero or more "parameters" (which constitute the children "elements" of the "event"). The event must have three attributes called "appAccID" (which is the identity of the client application for which the notification is destined) "serviceID" (which is the identity of the service plug-in which is sending the notification) and "type" (which specifies the type of the notification, for example test notifications, or callBack notifications). It also specifies that each parameter must have an attribute called "name" (which gives the name of the parameter) and contains parseable character data (ie pretty much anything).

For example, the following XML file would be validatable by this DTD:

```
<?xml version="1.0"?>
<!DOCTYPE event SYSTEM "event.dtd">
<event appAccID="iLocate" serviceID="SMS" type="callBack">
<parameter name="Event_Number">1</parameter>
<parameter name="Param2">Val2</parameter>
<parameter name="Param3">Val3</parameter>
</event>
``` which, in essence, specifies that the notification is for the iLocate application 110, that it has been sent from the SMS service plug-in 257 and that its type is a callBack type. Additionally, it contains 3 parameters, the first of which is called Event_Number and has value 1 (ie this is a serial number to enable this notification to be distinguished by the receiving application from subsequent similar notifications and also to prevent the application from acting on the same notification more than once in the event that it is erroneously sent more than once by the network). It also contains two other parameters called Param2 and Param3 having values Val2 and Val3 respectively which are redundant in this example but could be used to specify, for example, the identities of the parties 9, 19 between whom a text message to be picked up by the client application is being sent, etc.

Listener 112

In the present embodiment, the Listener 112 is formed using the Simple API for XML (SAX) toolkit which is a toolkit for parsing XML and pushing XML-generic events into applications. It is available for Java as well as other environments such as Microsoft. In the present embodiment, iLocate application 110 is written in Java.

In the present embodiment the Listener112 is formed by using the SAX toolkit which, as will be well understood by a person skilled in the art, requires registering a content handler, which is a (Java) method (object) within the client application 110, which knows what elements to expect within the XML and how to handle those elements (and their values) when they are delivered. Also, as will again be appreciated by a person skilled in the art, the listener 112 is also set up with the DTD, using the SAX toolkit, in such a way that it will validate the incoming XML against the DTD and call an error handler method (again, within the client 110) if there are any errors in the XML. The client application 110 then opens a socket on the network and when it gets a connection from the server it opens that connection as an input stream and passes that to the content handler (as a parameter on the parse( ) method provided by the SAX toolkit). As it parses the XML, inherited methods provided by the SAX toolkit enable the content handler method to be aware of every significant point in the parsing of the XML (start document, start element, etc.). In this way (which is all standard use of SAX) the content handler is able to build up a record of all the values from within the XML (appAccID, serviceID, type, parameters). When the content handler is made aware that the end of the event element has been reached, the content handler takes the event object it has populated with the values passed into it during parsing of the XML document and passes it to an event handler which reacts to the event in the appropriate way (e.g. contacting the identified Service plug-in—and thus, for example, to pull SMS messages off the server).

The client-side event object (i.e. in the application domain 100) is dissimilar to the object representing the event on the server side (i.e. in the gateway domain 200) for several reasons—there are a lot of parameters within the event object on the server side which are used in delivering the event (e.g. the retry parameter) and hence are not appropriate for the client to see. Also, the whole point of using XML is to decouple the server- and client-sides. It will also be apparent that the event object on the client side is defined outside SAX. SAX just tells the content handler what it's finding in the XML and the content handler uses that information as required by the application.

Note that client applications such as the iLocate application 110 can be developed in any desired development paradigm, such as Java, Perl, Microsoft, etc. Java developers may decide to use other XML toolkits for developing the Listener module (equivalent to Listener 112) such as DOM or JDOM. Microsoft developers might use SAX or the Microsoft XML Parser (MSXML). MSXML. Perl developers can also use SAX or some other toolkit provided specifically for Perl. Other client development environments could use their own XML toolkits.

The invention claimed is:

1. A system comprising:
    programmed computer devices which execute program code to provide a first sub-system and a gateway for offering services provided by the first sub-system to one or more application hosting sub-systems via the gateway and a data communications network between said gateway and said one or more application hosting sub-systems;

the gateway and each application hosting sub-system being arranged to permit each application hosting sub-system to initiate a secure and authenticated connection from each application hosting sub-system to the gateway via a non-secure data network connection, and the gateway being logically connected to the first sub-system to enable the services provided by the first sub-system to be provided to each application hosting sub-system via a secured and authenticated connection, the gateway including notification means for initiating an unauthenticated and unencrypted connection to one or more of the application hosting sub-systems and transmitting over this or each such connection a notification for notifying said one or more of the application hosting sub-systems that it should initiate a secure authenticated connection with the gateway when the notification means is requested so to do by any one of the services offered by the first sub-system.

2. The system according to claim 1 in which the notification takes the form of a non-executable data file.

3. The system according to claim 2 in which the notification takes the form of a simple text file containing an extensible Markup Language, XML, document.

4. The system according to claim 1 wherein the notification means is operable to run separate threads for controlling the forwarding of separate notifications to said one or more application hosting sub-systems.

5. The system according to claim 1, wherein the notification means includes means for permitting each service provided by the first sub-system to specify the number of times which a notification is to be retried in the event of failure to deliver the notification and means for retrying to deliver the notification up to the specified number of times in the event of failure to deliver the notification over the non-secure network.

6. The system according to claim 1 wherein a single notification server receives notifications from plural services and forwards these to plural application hosting sub-systems.

7. A method of offering services provided by a first sub-system to one or more application hosting sub-systems via a gateway which includes a notification means for notifying one or more of the application hosting sub-systems that it should initiate a secure authorized connection with the gateway, the gateway and each application hosting sub-system being arranged to permit each application hosting sub-system to initiate a secure and authenticated connection from each application hosting sub-system to the gateway via a non-secure data network connection, and the gateway being logically connected to the first sub-system to enable the services provided by the first sub-system to be provided to each application hosting sub-system via a secured and authenticated connection, the method comprising:

sending a request from a service wishing to set up a secure and authenticated connection to an application hosting sub-system that the notification means send a notification to a respective application hosting sub-system to notify it that it should initiate a secure authenticated connection with the gateway;

initiating from the notification means to the application hosting sub-system an unauthenticated and unencrypted connection and transmitting over this connection the notification for notifying said application hosting sub-system that it should initiate a secure authenticated connection with the gateway;

causing the application hosting sub-system to set up a secure and authenticated connection with the gateway in response to receipt of the notification; and communicating with the initiating service via said connection.

8. Computer readable storage media containing a program or suite of computer programs for controlling one or more computer processors to carry out the steps of claim 7 during execution of the computer program or suite of programs.

* * * * *

UNITED STATES PATENT AND TRADEMARK OFFICE
CERTIFICATE OF CORRECTION

PATENT NO.       : 8,666,940 B2                                                                 Page 1 of 1
APPLICATION NO.  : 10/594124
DATED            : March 4, 2014
INVENTOR(S)      : Roxburgh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 771 days.

Signed and Sealed this
Twenty-ninth Day of September, 2015

Michelle K. Lee
*Director of the United States Patent and Trademark Office*